United States Patent [19]

De Zen

[11] Patent Number: 5,706,620
[45] Date of Patent: Jan. 13, 1998

[54] THERMOPLASTIC STRUCTURAL SYSTEM AND COMPONENTS THEREFOR AND METHOD OF MAKING SAME

[75] Inventor: Vittorio De Zen, Woodbridge, Canada

[73] Assignee: Royal Building Systems (CDN) Limited, Woodbridge, Canada

[21] Appl. No.: 338,605

[22] PCT Filed: May 27, 1993

[86] PCT No.: PCT/CA93/00226

§ 371 Date: Nov. 22, 1995

§ 102(e) Date: Nov. 22, 1995

[87] PCT Pub. No.: WO93/24714

PCT Pub. Date: Dec. 9, 1993

[30] Foreign Application Priority Data

May 29, 1992 [CA] Canada ................................ 2070079

[51] Int. Cl.⁶ ............................................. E04C 2/52
[52] U.S. Cl. ..................... 52/220.2; 52/309.1; 52/270; 52/581; 52/582.1
[58] Field of Search ........................... 52/309.1, 270, 52/284, 282.1, 582.1, 581, 586.1, 586.2, 302.3, 220.2, 733.2, 736.1, 737.6, 781.11, 795.1, 144, 145

[56] References Cited

U.S. PATENT DOCUMENTS

| | | |
|---|---|---|
| 1,960,961 | 5/1934 | Thomas . |
| 2,143,288 | 1/1939 | Stolz . |
| 3,348,459 | 10/1967 | Harvey ........................... 52/586.2 X |
| 3,640,039 | 2/1972 | McKee et al. .................. 52/586.2 X |
| 3,657,849 | 4/1972 | Garton . |
| 3,662,507 | 5/1972 | Espeland . |
| 3,712,005 | 1/1973 | Eschbach et al. ................. 52/581 X |
| 3,992,839 | 11/1976 | La Borde . |
| 4,453,357 | 6/1984 | Zwilgmeyer .................... 52/309.1 X |
| 4,522,002 | 6/1985 | Davis et al. ....................... 52/309.1 |
| 4,536,360 | 8/1985 | Rahrig . |
| 4,557,091 | 12/1985 | Auer . |
| 4,560,618 | 12/1985 | Goswami ....................... 52/309.1 X |
| 5,014,476 | 5/1991 | Leslie et al. .................... 52/586.1 X |
| 5,311,718 | 5/1994 | Tronsilek . |
| 5,347,778 | 9/1994 | Bray ............................... 52/582.1 X |
| 5,403,631 | 4/1995 | Sato et al. ...................... 52/309.1 X |

FOREIGN PATENT DOCUMENTS

| | | |
|---|---|---|
| 0118683 | 9/1984 | European Pat. Off. . |
| 0320745 | 6/1989 | European Pat. Off. . |
| 2028228 | 3/1980 | United Kingdom . |
| 2191225 | 12/1987 | United Kingdom . |

*Primary Examiner*—Lanna Mai

[57] ABSTRACT

The invention is for a thermoplastic structural system, structural components therefor, and method of producing same in which the structural components are extruded from a thermoplastic material containing a reinforcing constituent flowable through an extrusion die, the structural components being configured for interlocking interconnection.

19 Claims, 12 Drawing Sheets

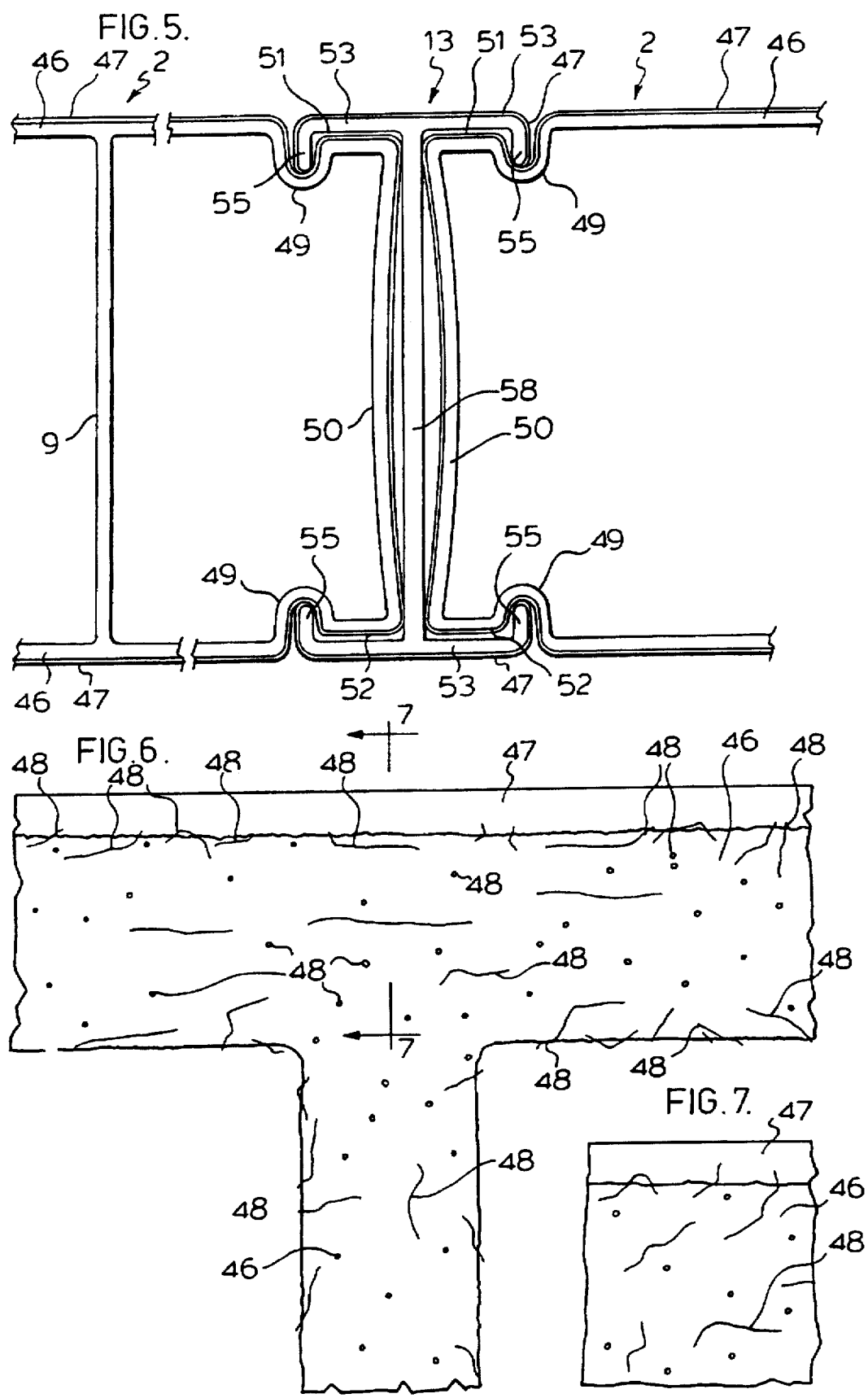

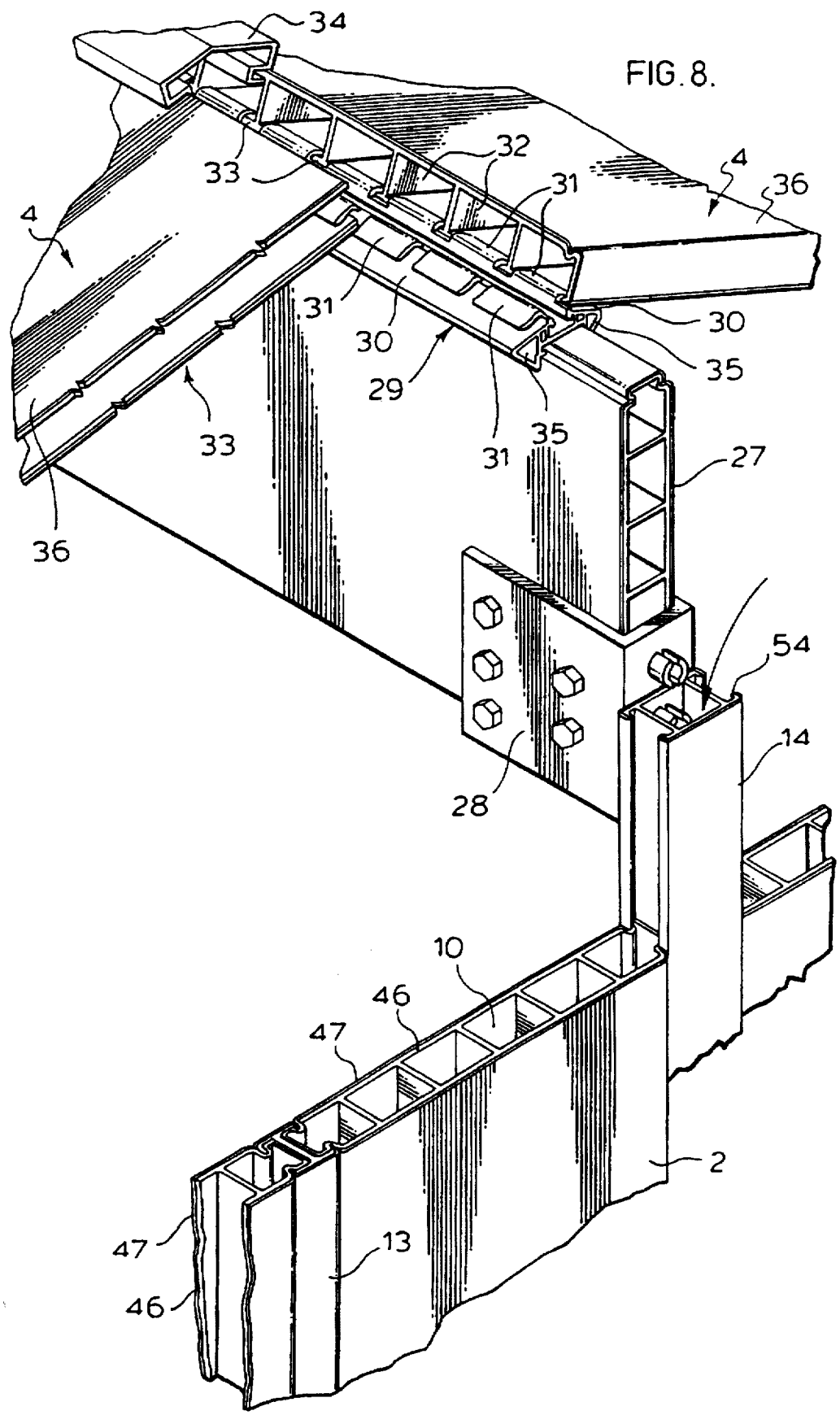

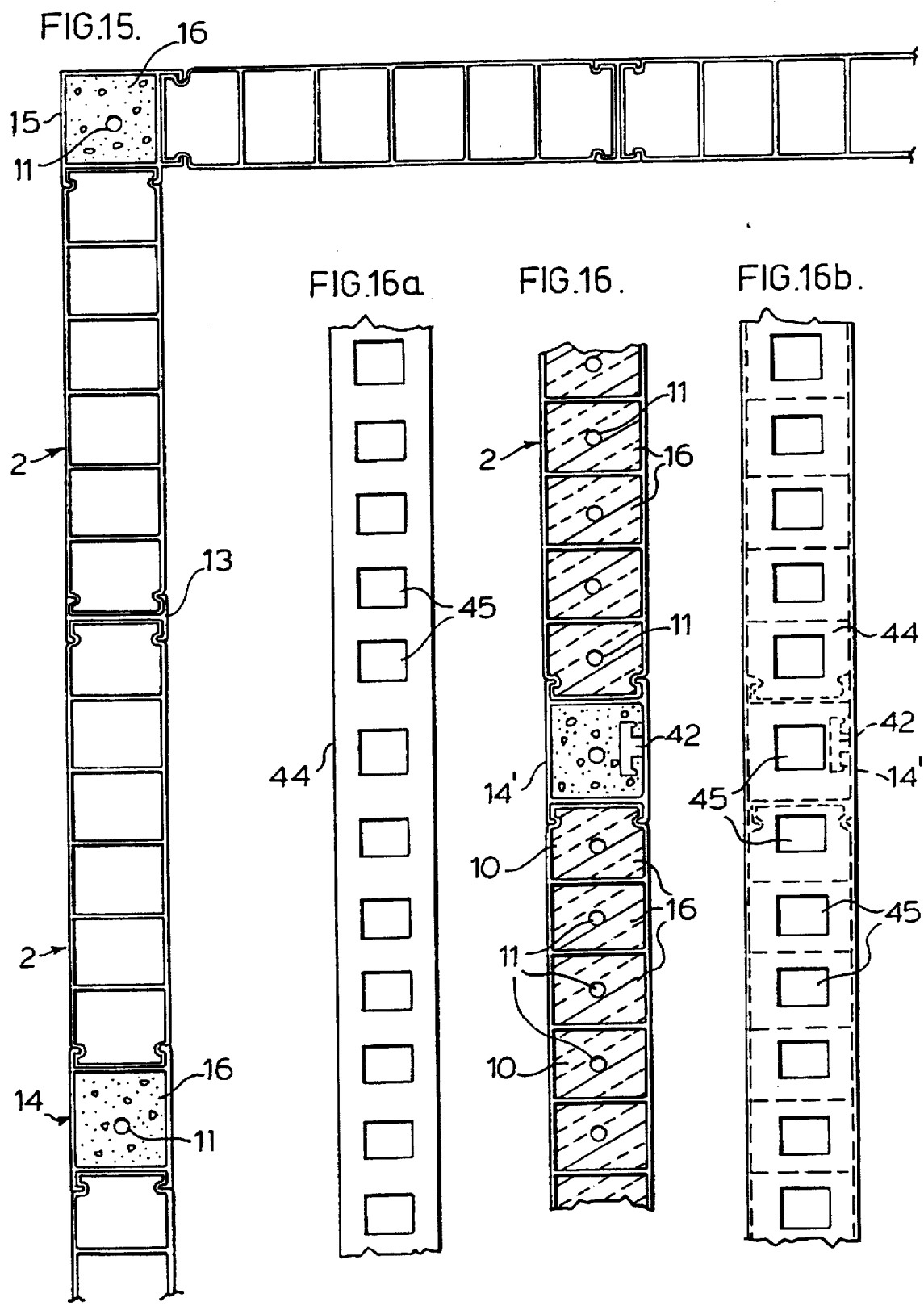

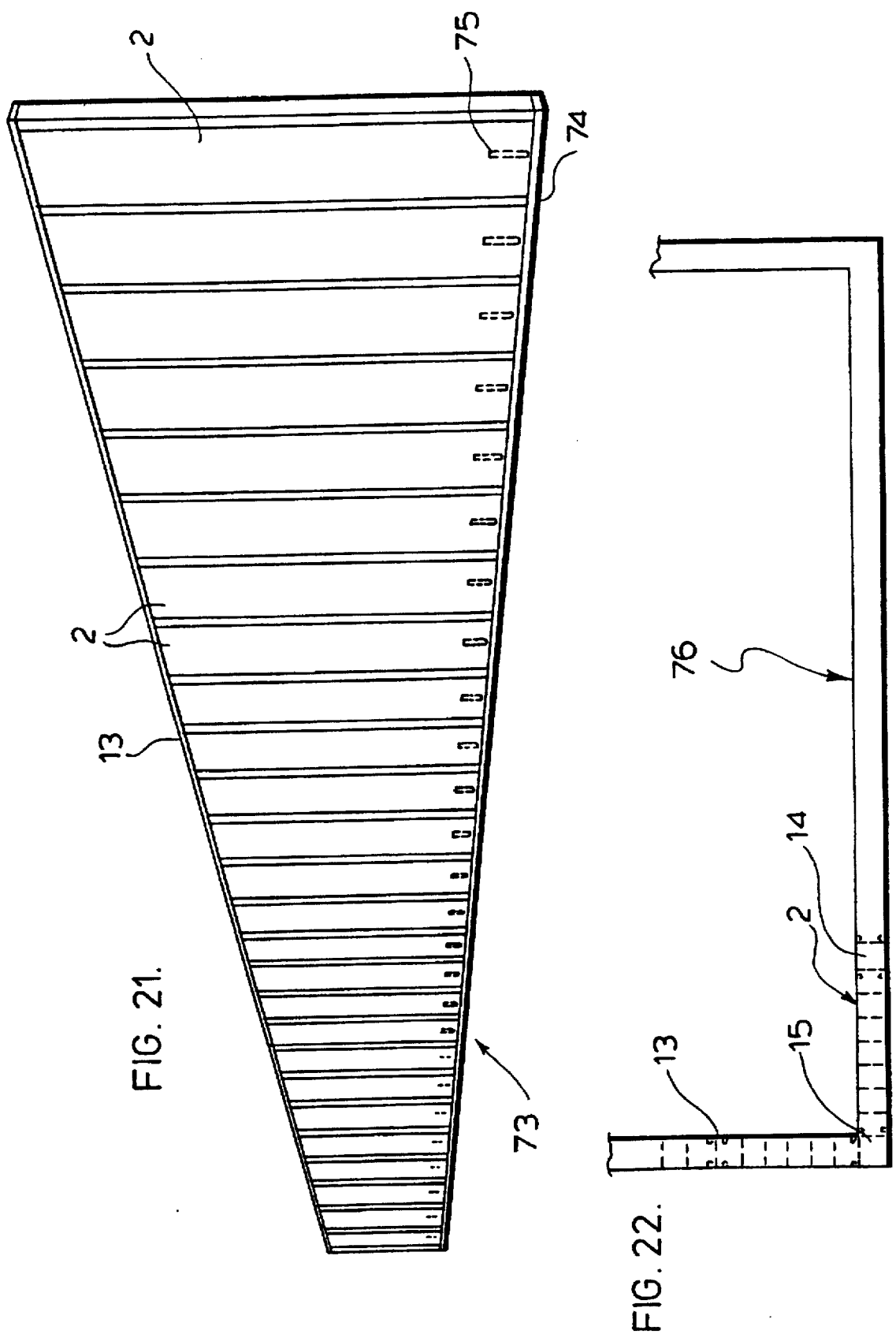

THERMOPLASTIC STRUCTURAL SYSTEM AND COMPONENTS THEREFOR AND METHOD OF MAKING SAME

FIELD OF INVENTION

The present invention relates to the provision of novel structural system and structural components therefor, their method of manufacture, and structures formed therefrom. More particularly, the invention relates to the provision of novel interlocking thermoplastic structural components which can be mass produced at low cost and which can be quickly and easily interlocked together to erect a wide range of structures which will require minimal maintenance and will be safe from termites, corrosion, rust or rot and will be highly resistant to the effects of weathering.

Further, the invention relates to the provision of such novel structural components which include hollow components adapted to accept concrete or other material therein to enable a structure erected therefrom to be anchored to a base and converted into a permanent and essentially indestructible structure which will withstand earthquakes, tornadoes and other natural phenomena. The invention also relates to the method of producing such components.

While the structural components of the invention can be used in the erection of a wide range of structures, it is of particular note that their existence now enables low cost durable or permanent housing to be provided for the masses throughout the word regardless of the climatic conditions.

DESCRIPTION OF THE PRIOR ART

While the use of plastic to form wall panels or the like for use in building construction has been proposed, such panels have not had the necessary load bearing or other structural requirements to form practical structures which could be mass produced at low cost and quickly easily assembled to erect durable low cost structures and, in particular, low cost housing.

U.S. Pat. No. 3,992,839, for instance, discloses a plastic panel fabricated from separate panel members, preferably formed of polyvinyl chloride which snap together to form a thin wall panel. The panels in turn are formed to snap together to provide a wall structure. Such fabricated panels are inherently weak and lack the strength and load bearing capacity to form adequate structural components for use for instance in the forming of the walls and roof of a practical durable building.

U.S. Pat. No. 3,662,507 discloses the use of tongue and grooved individually prefabricated panels said to be preferably of plastic which are bonded or glued together and used particularly for the forming of basement walls. Such panels do not permit of high speed production and are not capable of being quickly and easily interlocked together in the erection of a house or other structure.

U.S. Pat. No. 4,557,091 discloses a hollow panel member having a width of about one and one-half inches (1½") and a complicated interior formed by pultrusion, a process involving drawing long glass strands and a plastic binding material forcefully through a die under heat to form the glass strands into a compacted glass mat bound together by the plastic material. Such a process is prohibitively slow and expensive and the panels themselves do not provide acceptable or practical structures for forming the walls and roofing of a housing system such as contemplated by the present invention.

EP-A-O 320,745 discloses an arrangement of hollow interlocking structural components for a modular building which it is said may comprise extruded thermoplastic resin preferably reinforced with preferably about 30 per cent by weight glass fibers such as described in U.S. Pat. No. 4,536,630. Such proposed components are, however, unsuitable for practical housing as they are rough, abrasive, brittle and are subject to fracture and weather deterioration.

Further, the presence of substantial concentrations of glass fibers in the resin renders such components extremely difficult to extrude and the fibers are destructive of the extruding dies. If the glass fibers are too large or too concentrated, it is simply not practical to extrude them at all.

According to GB 2,028,228A, there is described a method of coating a polycarbonate sheet with an adherent synthetic resin ultra violet protective layer. In this method, an extruded resin layer, particularly methyl methacrylate and/or methyl acrylate is brought into contact with a surface of a planar extruded polycarbonate sheet while both are at elevated extrusion temperatures. The layers are then preferably calendered no effect adhestion therebetween.

The acrylic glass layer of GB 2,029,228A is non an impact or scratch resisting layer and simply protects against ultraviolet radiation. Also, it is a specific requirement of GB 2,028,228A that the protective acrylic glass layer be extremely thin being limited to 100 microns and preferably 50 micros as otherwise transmission of cracks into the polycarbonate layer may occur. To provide scratch protection, the acrylic glass layer in turn is coated with a scratch resistant coating by means of a coating solution.

The cost of attempting to produce the hollow interlocking structural components of the present invention using polycarbonate material as a substrate and acrylic glass as a coating would be prohibitive and it would not be possible to calendar any hollow co-extrusion without collapsing same. Moreover, the acrylic glass layer would not provide the protection against impact or scratching and the like and would necessitate a further protective coating.

SUMMARY OF THE INVENTION

The present invention resides in one of its aspects in the providing of novel thermoplastic structural components which can be quickly and easily interconnected to erect a wide range of structures from simple walls, fences, and enclosures, to complete houses or buildings, said thermoplastic structural components incorporating a reinforcing constituent imparting structural strength and expansion control thereto and flowable with the thermoplastic material through an extrusion die, said components being extruded into an integral essentially rigid structural shape having the reinforcing constituent distributed throughout the thermoplastic material, said structural components being configured to present means for interconnection with adjoining structural components so that they can be easily and quickly locked together in the erection of the structure desired.

The structural components according to the invention include extruded hollow panels, extruded hollow panel box connectors or columns, extruded hollow beams and adapters, and extruded panel connectors, all of which are provided with integrally formed means to enable interlocking connection with adjoining structural components for quick and easy assembly into the structure being erected.

Also according to the invention, the hollow wall panels and columns have a structural strength to accept the pouring of concrete or the like therein without deformation to provide permanent essentially indestructible wall structures.

In the case of the erection of a house or building, it will be understood that with the walls of the house or building erected on a concrete pad with the wall panels and/or wall panel connecting columns of the invention anchored with concrete to the pad a permanent roof supporting wall structure resistant to tornadoes, earthquakes and other natural phenomena is provided.

According to the invention, there is provided hollow rectilinear extruded thermoplastic structural components for a structural system in which said components have spaced longitudinally extending interlocking means for slidable interlocking engagement with adjacent mating components characterized in that each said hollow component is a co-extrusion of a hollow substrate and an impact resistant and weather protecting skin substantially thinner than the walls of said substrate, said substrate comprises a polyvinyl chloride reinforced with a reinforcing and expansion controlling constituent extruded into a hollow form having a rough surface with said co-extruded impact resistant and weather protecting skin (47) covering the surfaces of said hollow component which are exposed as exterior walls where said hollow component is interlocked with a mating component, said skin has a thickness sufficient to cover and seal and interlock with the underlying rough substrate surface to present said exposed exterior walls as planar smooth surfaces. In a highly practical embodiment of the invention the protective skin has a thickness at least of the order of about 0.015 inches, and the substrate has a thickness of the order of about 4 to 5 times the thickness of the skin.

In its preferred form, the invention resides in forming the structural thermoplastic components aforesaid by extruding such components to have a polyvinyl core or substrate having reinforcing glass fibers anchored in and distributed therethroughout imparting tensile strength and expansion control thereto while co-extruding the smooth thermoplastic skin on the exposed exterior surfaces of said core, the said skin embedding and interlocking with glass fiber portions that are exposed at the interface between said reinforced core and said skin.

In accordance with the preferred form of the invention, the thermoplastic skin provides an attractive maintenance free smooth surface adding to the appearance and ease of handling and interlocking the structural components as well as providing an impact resistant surface protecting the glass fiber reinforced core and the embedded glass fibers against external shock. Moreover, the thermoplastic skin can be colored as desired and provided with appropriate ultra violet protective agents as will be understood to protect such color and prevent weathering.

The structural system of the invention has particular value in the housing field whereby a house or building may be constructed on a concrete pad and formed of interconnected extruded structural components as aforesaid including hollow wall and roof panels and connecting columns. The wall panels are anchored to the concrete pad by concrete introduced internally into said hollow wall panels and/or connecting columns as desired. It will also be understood that if desired the house structure, including the walls and roof, can be clad with any decorative exterior as desired.

The invention further resides in the method forming the structural components by coextruding the smooth thermoplastic skin and the reinforced polyvinyl substrate to facilitate extrusion and to effect the bonding therebetween.

These and other features of the invention will be understood from following detailed description taken in conjunction with the accompanying drawings

BRIEF DESCRIPTION OF THE DRAWINGS

FIG. 5 is an enlarged end view illustrating the manner in which the joiner connects to adjacent panel components.

FIG. 6 is a broken away cross-sectional view illustrating the structure of a typical extruded structural component having a thermal plastic core or substrate incorporating reinforcing glass fibers with the exposed exterior surface covered with a smooth thermoplastic skin sealing the substrate surface and embedding the glass fibers to be anchored thereby to the substrate.

FIG. 7 is a cross-sectional view on line 7—7 of FIG. 6.

FIG. 8 is a broken away perspective view illustrating the assemblage of the exterior wall panels and interior wall panel and the roof panels at the ridge of the house.

FIG. 15 is a top plan view of a wall which may be the wall of any structure as well as that of a house embodying the invention and illustrating the use of concrete only in the box connectors or columns.

FIG. 16 is a broken away top plan view illustrating a wall structure in which the individual cells of the panels themselves as well as the box connector or column joiner are filled with concrete for maximum wall strength.

FIG. 16a is a top view of a concrete pouring guide.

FIG. 16b is a top view of the concrete guide of FIG. 15a fitted atop a wall panel used to provide the concrete filled wall structure of FIG. 16.

FIG. 21 is an elevational view of a fence, wall, sound barrier or other similar structure embodying the invention and erected with structural panels and connectors of the invention.

FIG. 22 is a diagram illustrating an enclosure erected according to the invention with structural panels and connectors of the invention.

DETAILED DESCRIPTION OF THE PREFERRED EMBODIMENTS

The structural components of the invention have great utility in the erection of a wide range of structures but have special importance in the field of housing since there is a desperate need for low cost durable or permanent housing throughout the world which efforts to date have not been able to resolve. The requirements of such housing are that they must be constructed from components that can be massed produced at low cost and quickly and easily assembled to form a durable or permanent structure by unskilled workman. Further the resulting structure must be such as to withstand wide variations in climatic conditions and be capable of withstanding the shock of earthquakes, tornadoes, wind, hail, rain and snowstorms, high humidity, wide temperature ranges, without corroding, rotting or rupturing. Such housing must also be impervious to termites and other insects. Additionally, to be truly and widely accepted, such housing must have a satisfactory aesthetic appeal.

The present invention in addition to its utility for erecting all kinds of other structures for the first time enables the provision of housing meeting all of the above criteria as will hereinafter appear.

Figure 1:
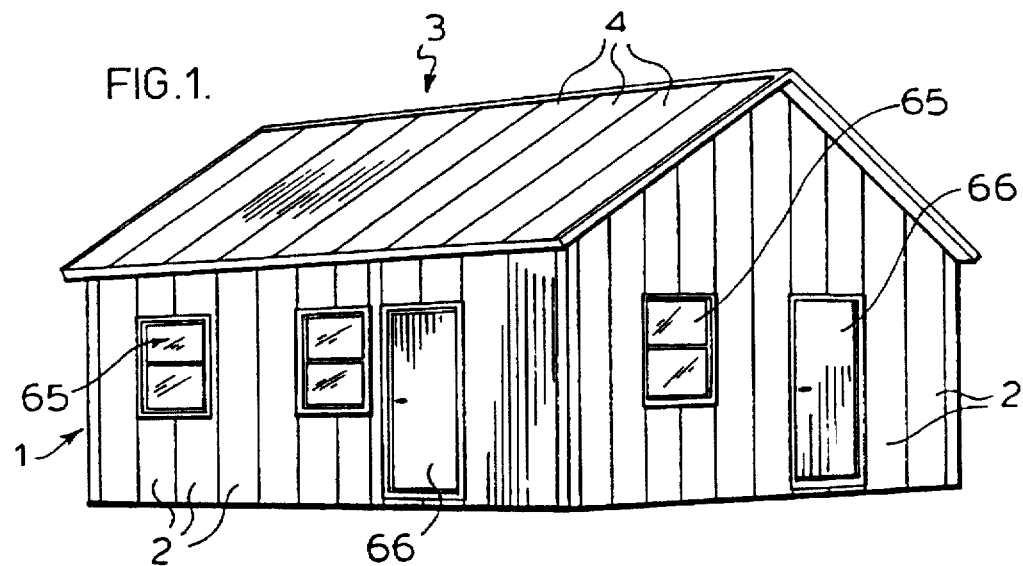
FIG. 1 is a perspective view of a house constructed of extruded thermoplastic structural components in accordance with the invention.

With reference to FIG. 1, a typical house which the invention provides has walls 1 assembled from wall panels 2 and a roof 3 assembled from roof panels 4 as shown in FIG. 8.

The wall and roof panels are configured to be connected into the housing structure by interlocking mating engagement with adjoining members so that they can be assembled without the use of tools as hereinafter more fully discussed.

Figure 2:
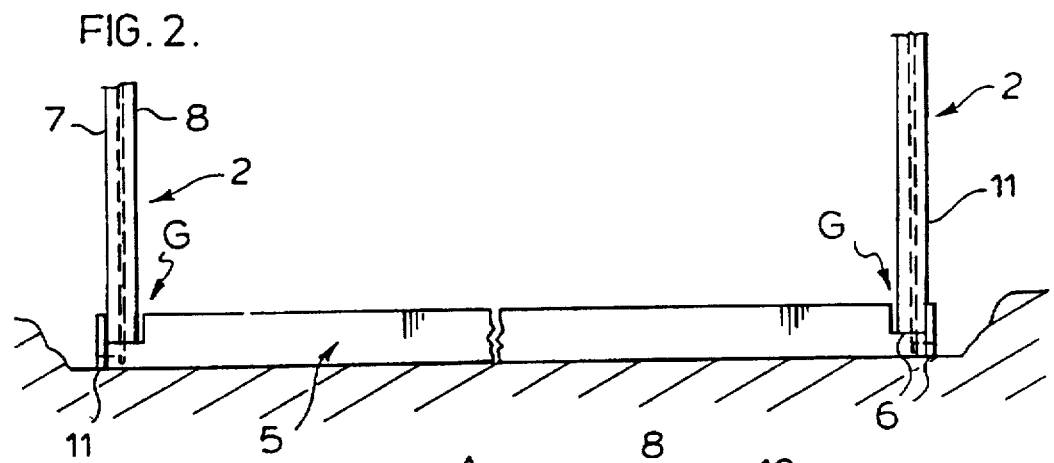
FIG. 2 is a broken away view showing how the wall panels of the house sit on a concrete pad.
Figure 3:
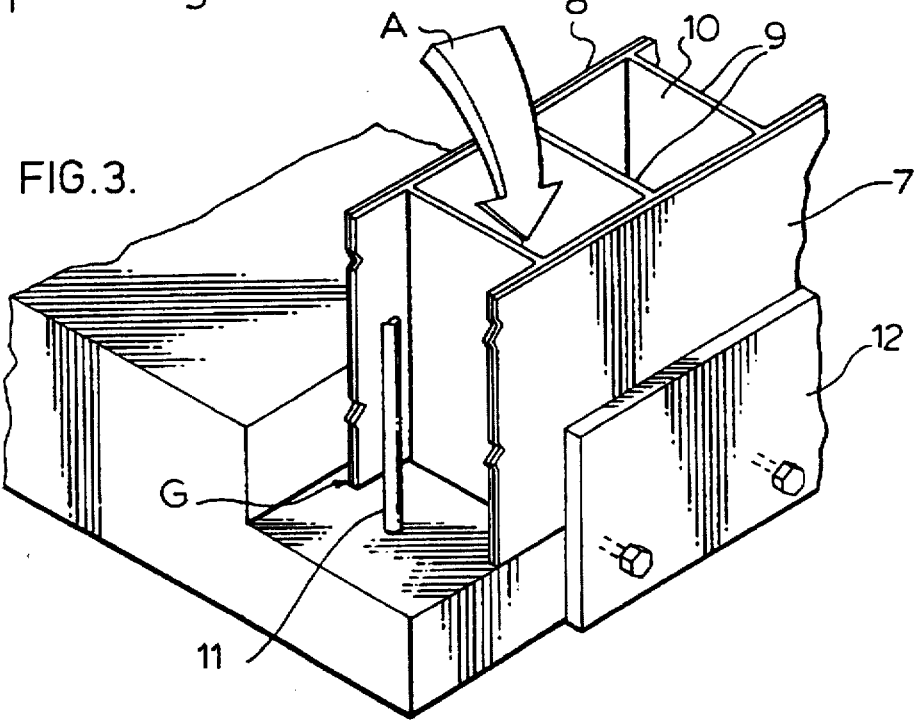
FIG. 3 is an enlarged perspective broken away view illustrating the seating of a wall panel on the concrete pad with the arrow indicating where anchoring and reinforcing concrete or the like can be introduced.

As shown in FIG. 2, all that needs to be done to prepare the site of the house is to construct a concrete pad 5, having a reduced thickness border flange 6 forming a ledge to receive the wall panels 2, as shown particularly in FIG. 3.

The wall panels 2 have spaced exterior and interior walls 7 and 8 connected by transverse webs 9 forming internal cells 10 into which concrete can be poured as illustrated by the arrow A as desired to provided an extremely strong permanent wall structure. Additionally, the concrete pad can be provided with anchor rods 11 as desired projecting up into the cells 10 to anchor the concrete poured into the cells and hence the wall panels to the pad. A runner 12 is provided to contain concrete from seeping out underneath the wall panel.

As can be seen if FIG. 2 of the drawings, the walls of the house and the size of the concrete pad are dimensioned such that there is a very slight gap G to the inside of the walls at the thickened portion of the pad. This provides a tolerance to ensure that the walls will fit down around the thick part of the pad and rest on the thinner border flange 6 as again seen in FIG. 2 and as also shown in FIG. 3 of the drawings.

When the concrete is poured into the walls, it does, as found in conventional concrete pouring methods, contain a certain amount of water. As can again be seen in FIG. 3 of the drawings, the wall forming panels are left open at their lower ends where they seat atop the concrete pad flange 6. This allows the water in the concrete to effectively drain out the bottom of the wall panels and, although runner 12 does provide an effective guard against concrete seepage from beneath the wall panels, it is not a water guard and therefore allows any water from the concrete in the wall panels to drain off of the pad. The runner 12 further provides a guide assisting in alignment of the wall panels along the outer edge of the concrete pad.

Figure 4:
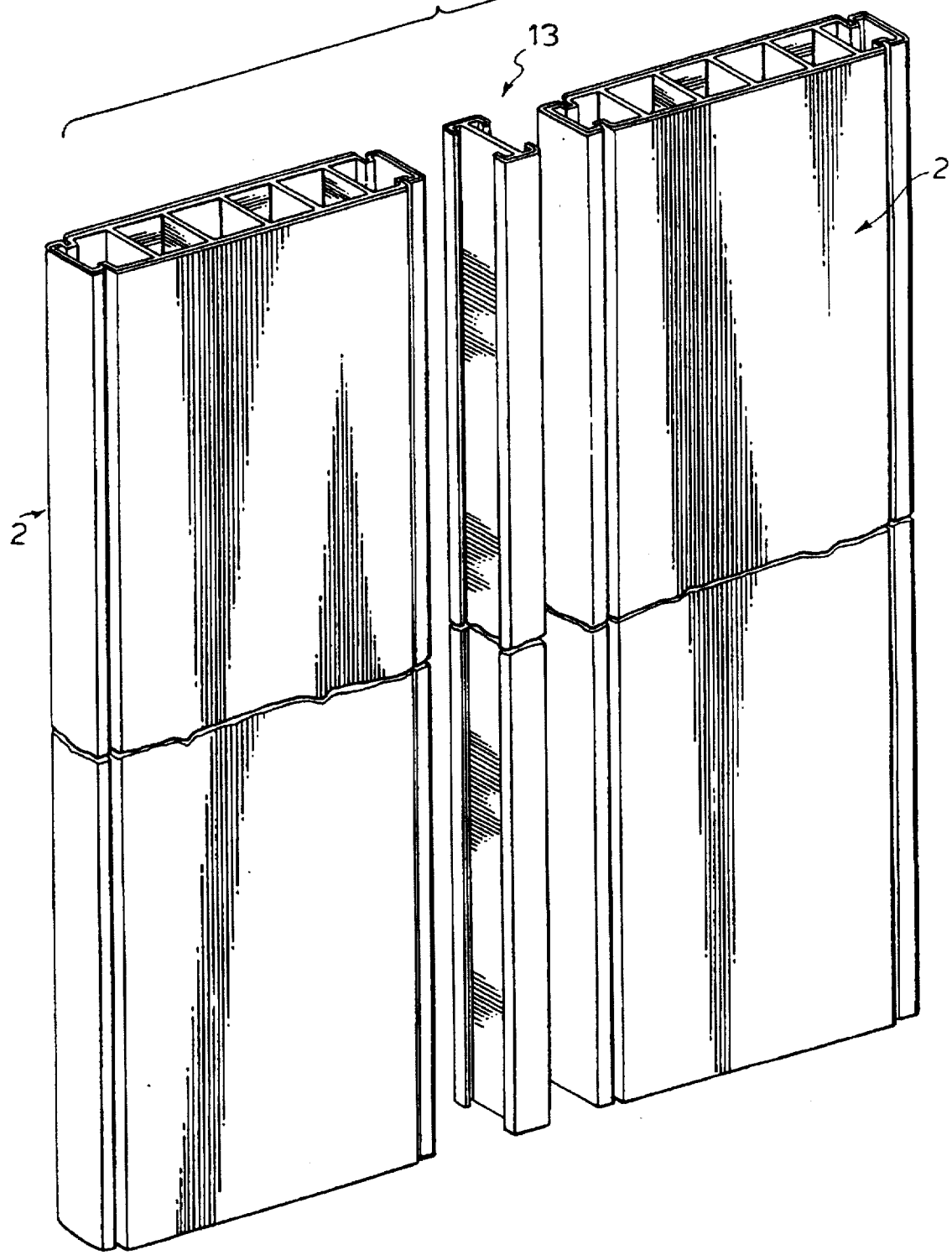
FIG. 4 is an enlarged broken away perspective view illustrating a pair of panel members and a joiner therefor ready to be assembled.

As illustrated in FIGS. 4 and 5, adjoining panels are adapted to be connected by a joiner 13 and then, as shown in FIG. 15, the free end of the panels are interlocked with a vertical column 14. Column 14 is a typical column for interlocking with adjoining interlocked panel pairs intermediate the length of the wall while column 15 is a corner column for interlocking adjoining walls which meet at a corner. As shown in FIG. 15, the columns 14 and 15 are filled with concrete 16 and are anchored to the concrete pad by the anchor rods 11. FIG. 15 illustrates the situation where only the connecting columns 14 and 15 receive concrete, whereas FIG. 16 illustrates concrete in both the column 14 and the internal cells 10 of the wall panels 2.

If the house structure is intended to be subsequently moved, sand can employed in place of concrete in the columns and/or internal wall panel cells as desired to give the structural strength and anchorage desired. Also, of course, the internal wall cells 10 and/or the locking wall columns 14 and 15 can be filled with material other than concrete including insulation material. Alternatively, the columns could be filled with concrete and the panels filled with insulation material or such other arrangements as desired.

To have the house of modular form, for convenience, the wall panels 2, joiner 13, and columns 14 and 15 have been dimensioned to provide a lateral distance from center line of column to center line of column of one meter. The thickness of the wall panels 2 from exterior wall 7 to interior wall 8 has been conveniently selected as four inches as a balance between cost and structural strength. Such walls, of course, may have a greater thickness but this adds to the cost while substantially thinner walls reduce wall strength and the amount of concrete that such walls can accept.

Figure 12:
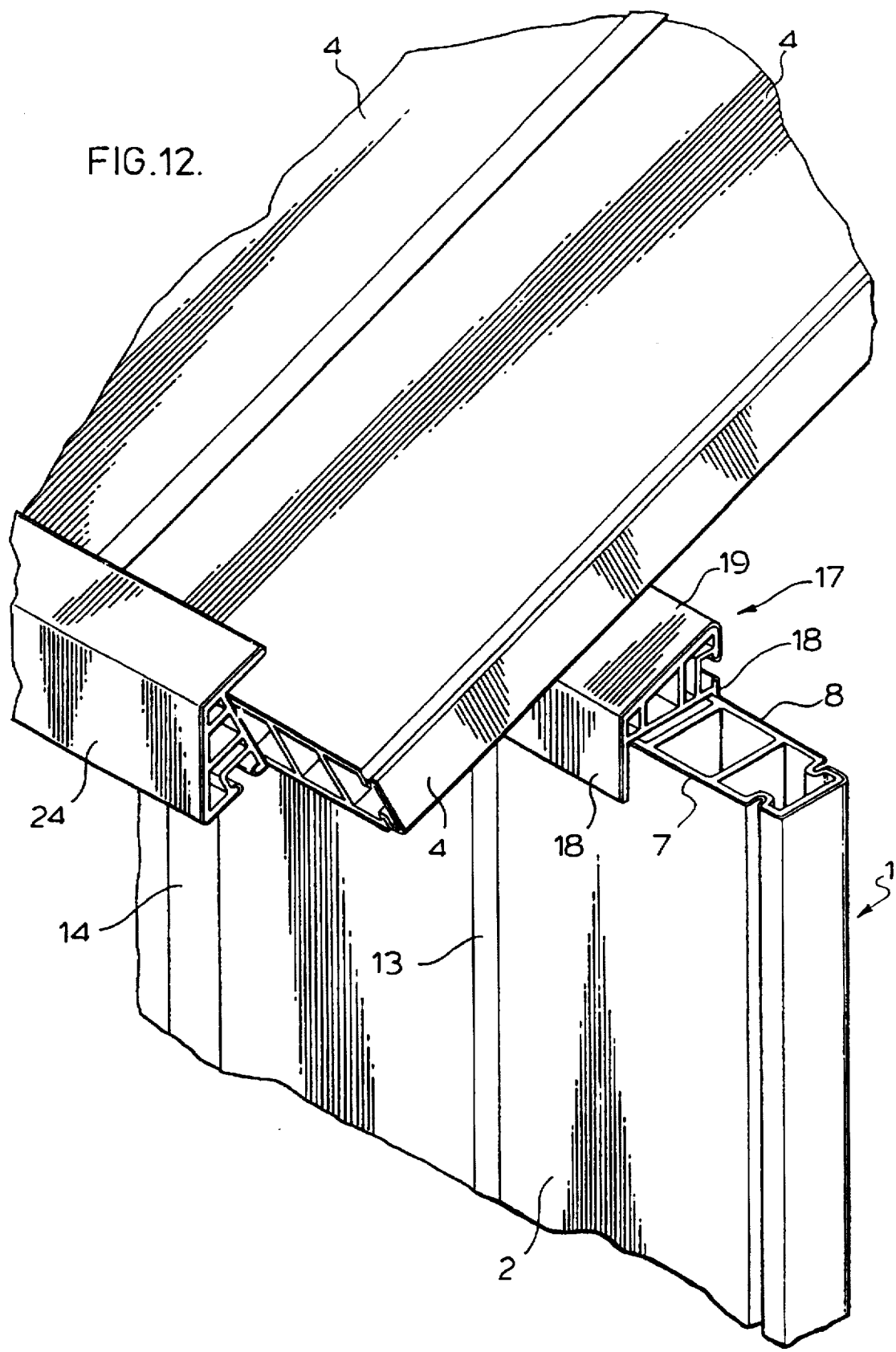
FIG. 12 is a broken away perspective view illustrating the mounting of the lower end of a roof panel on the wall structure and the capping for such lower end roof panel.
Figure 13:
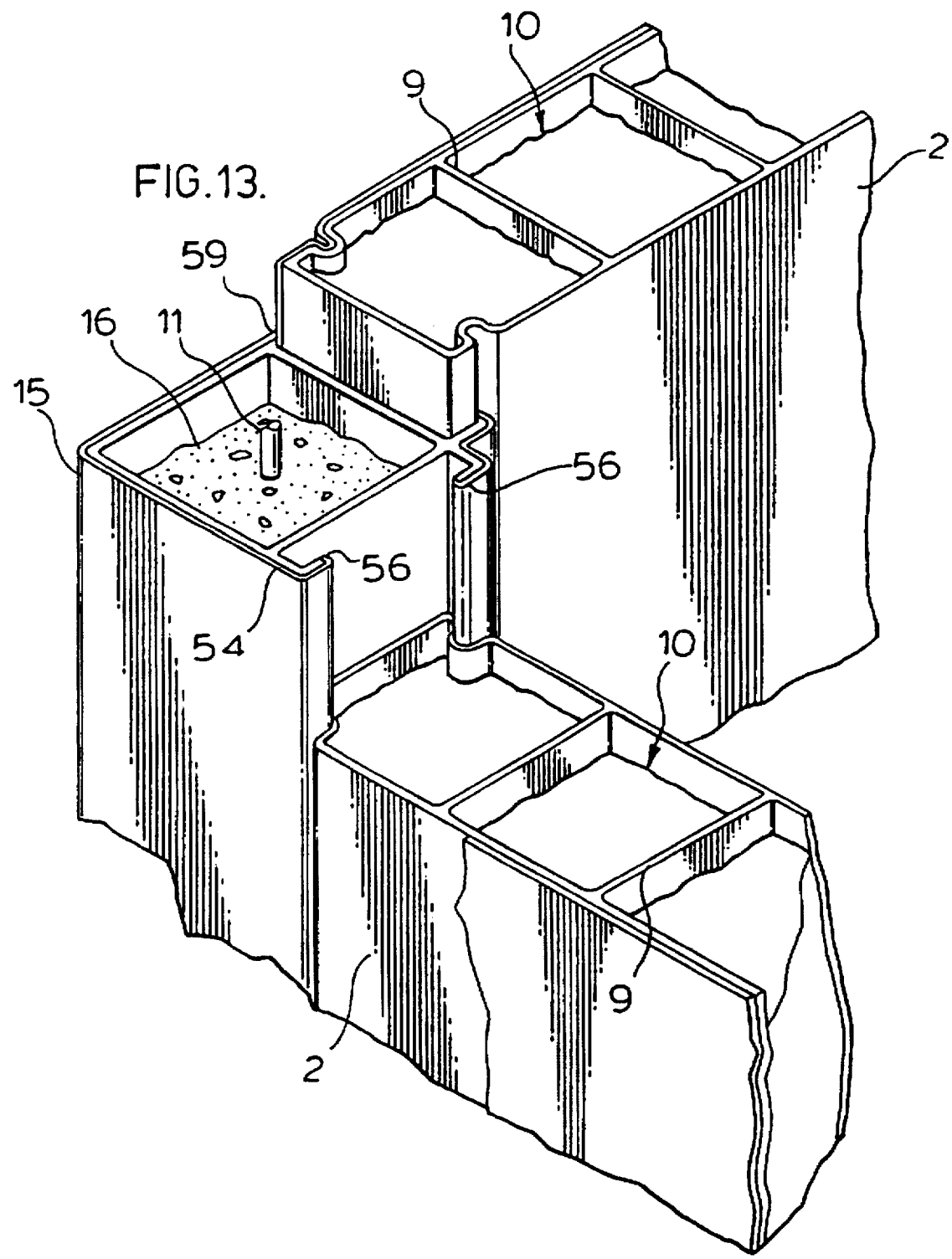
FIG. 13 is a broken away perspective view of a wall corner illustrating how the hollow wall panels and corner box connector or column constitute concrete forms to receive concrete or the like to anchor the wall structure to the concrete pad and to create an impregnable rigid wall structure of discrete concrete filled cells capable of withstanding earthquakes, tornadoes and other natural phenomena while at the same time providing effective insulation against heat and cold transfer.

As illustrated in FIG. 12, the upper ends of the walls 1 are capped by a hollow wall cap beam 17 having flanges 18 embracing the exterior and interior walls of the wall panel to firmly seat thereon. This wall cap or beam is of a hollow configuration and has a sloping upper surface 19 to support the lower ends of the roof panels 4.

Figure 17:
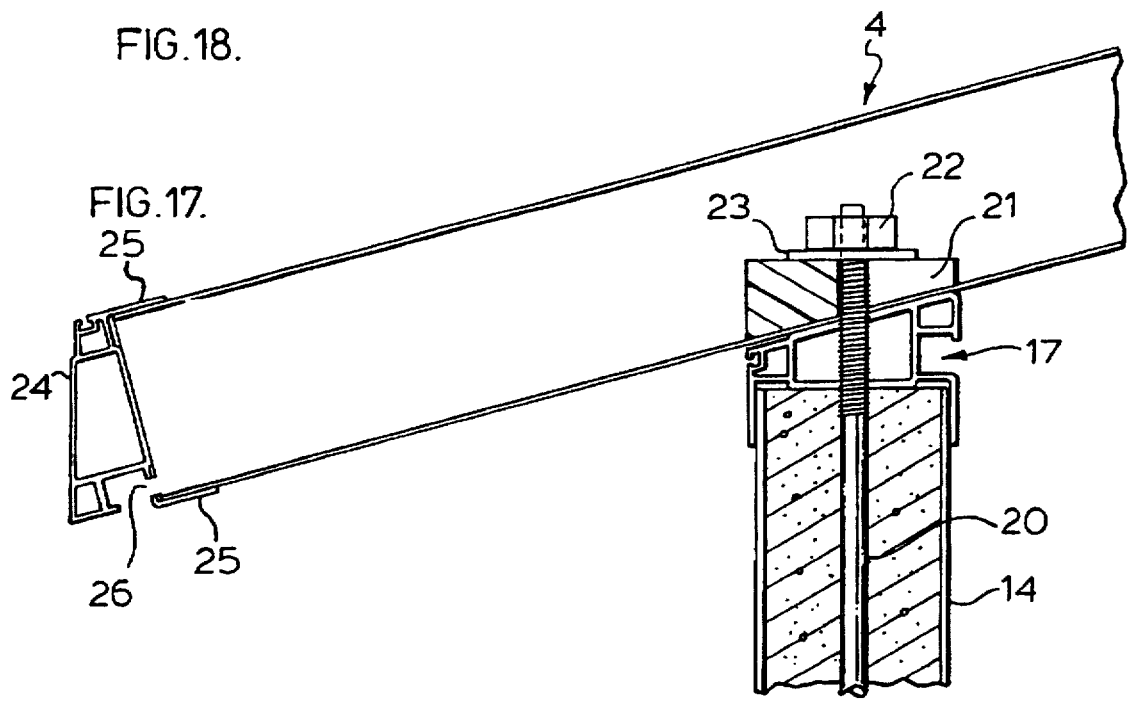
FIG. 17 is broken away cross-sectional view illustrating one manner of connecting the roof panels to the house walls.

As shown in FIG. 17, the means of securing the roof panels 4 to the sloping wall cap surface 19 may comprise a threaded rod 20 embedded in concrete in one of a wall column 14 or internal wall panel cells 10 and projecting up through wall cap 17 and a wedge clamp 21 secured by nut 22 and washer 23 threaded onto the upper end of rod 20. Hollow end cap beam 24 with flanges 25 embracing the upper and lower surfaces of the roof panels closes off the lower ends of these panels but provide suitable drainable openings 26 which also allow air circulation through the hollow roof panels 4.

As shown in FIG. 8, centrally of the depth of the house is a hollow ridge panel or beam 27 of similar construction to the wall panels 2 supported by a yolk 28 carried by a column 14. Interlocked on the top of the ridge beam 27 is a roof panel ridge connector beam 29 having sloping roof panel supporting surfaces 30 which terminate in upwardly and rearwardly extending flanges or fingers 31 which project into the cells 32 of the roof panels 4 to overlie and hold the lower surfaces 33 of such cells, thereby anchoring the upper ends of the roof panels to the ridge beam 27. A ridge vent 34 is provided to cover the spacing between the upper ends of the roof panels 4 and interlock therewith while allowing air to circulate through the ridge vent, the roof cells 27 and out the vent openings 26 in the end cap 24. The roof panel ridge beam 27 is provided with closed hollow sections 35 underlying the support surfaces 30 to impart strength and rigidity thereto.

The roof panels 4 may have dimensions similar to those of the wall panels 2 but, where increased roof spans are required or heavy roof loads are anticipated, the depth of thickness of the roof panels that is the separation between the lower roof surfaces 33 and the upper roof surfaces 36 may be increased, for example to six inches and as well the gas well the glass fiber content may also be increased. Similarly, the depth or thickness and glass content of the ridge panel beam can be increased where heavy loading is to be expected.

Figure 11:
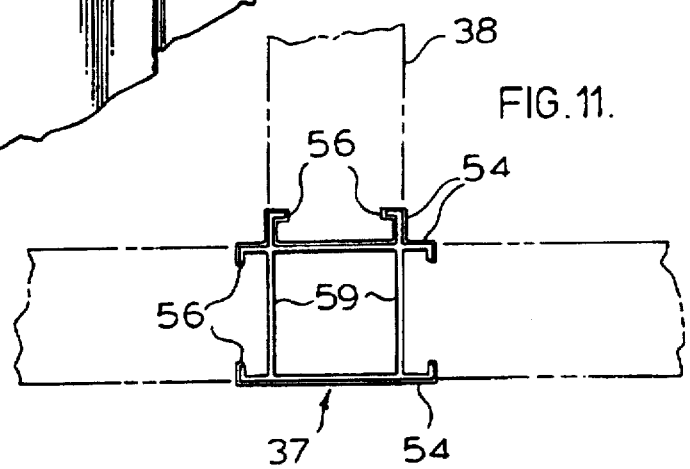
FIGS. 10 and 11 illustrate other forms of panel box connectors or columns.

In addition to the columns 14, for joining straight wall sections and the corner columns 15, as illustrated in FIG. 11, columns 37 are provided for connecting an internal wall panel 38 to the panels forming one of the external walls 1.

Figure 9:
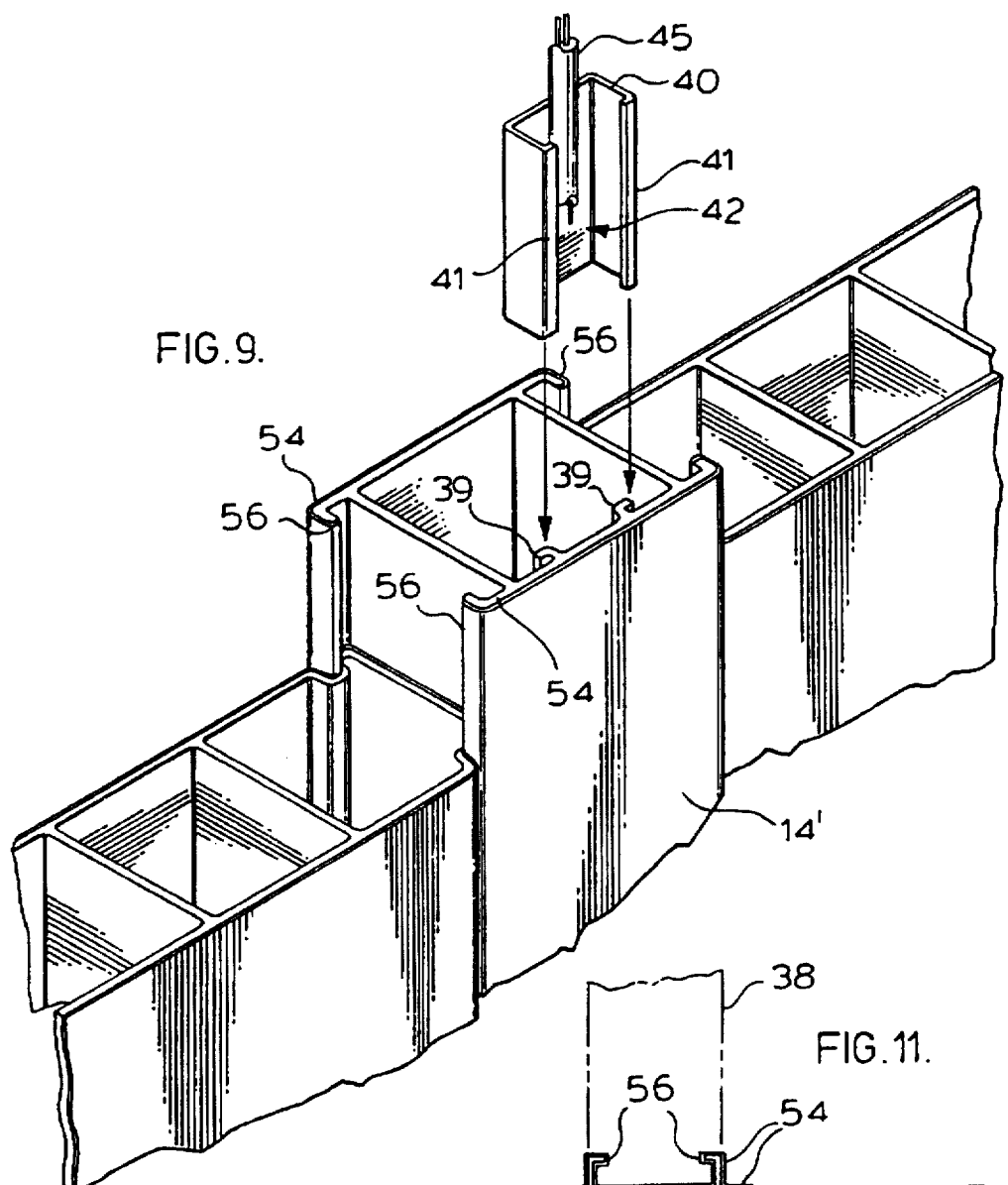
FIG. 9 is a broken away perspective view illustrating a wall joining box connector or column provided with interlocking means to receive a channel forming insert to carry electrical wiring internally of the wall.

It is highly desirable to conceal the electrical wiring to be used in the house internally within the walls. To this end, there is shown in FIG. 9 a column corresponding to column 14 and designated as 14' which includes a pair of spaced fingers 39 which project interiorly of the column and are turned outwardly in opposite directions to provide slide guides for receiving a channel 40 having inturned flanges 41 which slidingly interlock behind the fingers 39 to provide a separate compartment 42 for receiving wiring 43 or other services.

This separate compartment 42 provided on assembly of the channel 40 within the column 14' can be closed off upon concrete being poured into column 14' to leave the channel open for the reception of the wiring 43.

FIGS. 16a and 16b show features which enable loading of the concrete into the wall without exposing compartment 42 to the concrete. In particular, FIG. 16a shows a concrete guide or jig generally indicated at 44 having a series of openings 45 provided therein. As shown in FIG. 16b, the jig 44 is placed atop the wall structure and the openings in the jig align generally centrally with each of the cells or compartments 10 in the wall structure. Of particular interest, the opening through the jig over column 14' does not line up with the compartment 42 formed by the channel 40 engaged with the guides 39 which are protected by the body of the jig. Channel 40 and guides 29 are in abutting contact with the bottom of the jig and, therefore, when the concrete is poured through the jig, the compartment 42 is effectively sealed off from the concrete flow. The jig has the added benefit that it provides a top level to which the concrete is filled and, because of the smaller size of the openings in the jig relative to the compartment sizes, helps to prevent any overflow of concrete material from the wall structure.

It will be appreciated that to produce a stable, solid and permanent structure such as, for example, a house structure as described above requires the various components panels such as the wall panels, wall connecting columns and joiners, the roof panels, the wall beams such as the wall caps and the ridge beams to have the structural strength and load bearing capacity to perform their functions. At the same time, to be practical these components have to be capable of being produced in large quantities at low costs.

While ordinary thermoplastics such as vinyl chloride, eg. polyvinyl chloride (PVC), can be readily extruded to a desired shaped, the resulting product does not have sufficient strength to constitute a load bearing structural member adequate for the building of a substantial load withstanding or permanent structure. Further such a member has unacceptable dimensional changes with temperature. On the other hand, strengthening the plastic material in a manner which renders it uneconomical to produce product therefrom is equally unacceptable.

The structural components of the present invention are achieved by the use of a thermoplastic material reinforced in such a manner that the reinforced thermoplastic provides the requisite strength and expansion control yet is still flowable through an extrusion die. In this way the component can be continuously extruded with the reinforcing constituents distributed throughout the thermoplastic material and with the walls of the component being continuous and integral at their juncture.

While there are known thermoplastic reinforcing agents such as mineral or other fibers and known expansion controlling agents such as calcium carbonate, a reinforcing agent or constituent particularly useful for the present invention, comprises small glass fibers. These glass fibers when anchored in a thermoplastic material such as vinyl chloride, eg. a polyvinyl chloride (PVC), provide the requisite reinforcing and expansion controlling characteristics suitable in the various structural components of the invention.

A suitable material incorporating small glass fibers which can be used in the production of the structural components of the invention is available under the trade-mark FIBER-LOC from the B.F. Goodrich Company of Akron, Ohio, such material being described in detail in B. F. Goodrich's U.S. Pat. No 4,536,360 wherein very fine short glass fibers are bound within a composition of vinyl chloride resin.

The presence of glass fibers in the PVC or other thermoplastic material while providing tensile strength and expansion control to the material creates an extrusion problem and, if they are too large and too concentrated, it is not practical to extrude the material. Preferably such fibers should be of the order of a few microns in diameter and a few millimeters in length and in concentrations not greater than, and preferably substantially less than, about thirty-five percent by weight based upon the combined weight of glass fibers and vinyl chloride resins.

Also, the presence of the glass fibers creates a brittleness which makes a structure produced solely from a glass fiber reinforced plastic subject to potential fracture from impact. This potential increases with increased concentration of glass fibers.

According to the preferred form of the invention, the problems encountered with the use of the glass fibers as the reinforcing constituent while utilizing their beneficial reinforcing qualities have been resolved by co-extruding with the glass reinforced thermoplastic a smooth thermoplastic skin covering the external exposed surfaces of the various structural components.

The smooth plastic skin may be PVC, rigid PVC, semi-rigid PVC, ABS, polycarbonate. Suitable thermoplastics are available from G.E. under the trade-mark GELOY and NORYL.

Thus, according to the preferred form of the invention, the structural components having the characteristics desired, as shown particularly in the enlarged views FIGS. 6 and 7, comprises a core or substrate 46 comprising a glass fiber reinforced thermoplastic such as PVC and a co-extruded smooth outer skin 47 covering the exposed exterior surfaces of the structural component.

The skin 47 serves a number of useful purposes. Because of the presence of the glass fibers 48 in the core or substrate 46, the substrate is somewhat brittle and its surfaces are rough and abrasive with portions of the glass fibers projecting through the surface of the substrate rendering the substrate somewhat porous and susceptible to the ingress of moisture which can adversely effect the bond between the glass fibers and the thermoplastic material.

The co-extrusion of the thermoplastic skin covers and seals the outer exposed surfaces of the structural component against the ingress of moisture thereby maintaining the integrity of the binding of the glass fibers to substrate plastic. Further, the outer skin 47 not only covers exposed glass fibers 48 but these exposed glass fibers become embedded in the thermoplastic material so the exterior surface of the component is totally smooth. The glass fibers in turn in becoming embedded in the outer skin lock the skin to the substrate so that the expansion and contraction of the outer skin is fixed to the expansion and contraction of the substrate which is controlled or limited by the presence of the incorporated glass fibers which have a much smaller coefficient of expansion than the plastic.

Another important function of the outer skin 47 is that the thermoplastic material selected for the skin can be formulated, as will be appreciated by those skilled in the art, to include agents providing impact resistance. Thus the skin can provide an impact resistant or absorbing covering encasing the exposed surfaces of the structural component, thereby rendering the structural component impact resistant.

The outer skin 47 can also incorporate any desired coloring and can be made resistant to ultraviolet radiation so that it will not fade by the inclusion of a weathering agent as will be understood by those skilled in the art.

The combination of the coextruded substrate 46 and smooth skin 47 thus enables the provision of structural components which are essentially maintenance free, and impact resistant, and which will not corrode, rot or rust and which will be impervious to moisture, termites, and other insects.

As particularly illustrated in FIG. 5, the walls of the panels, whether wall panels 2 or roof panels 4, make provision for interconnection into the house structure by being extruded to provide opposing slide channels or grooves 49 inwardly of the panel edge or side walls 50.

Figure 10:
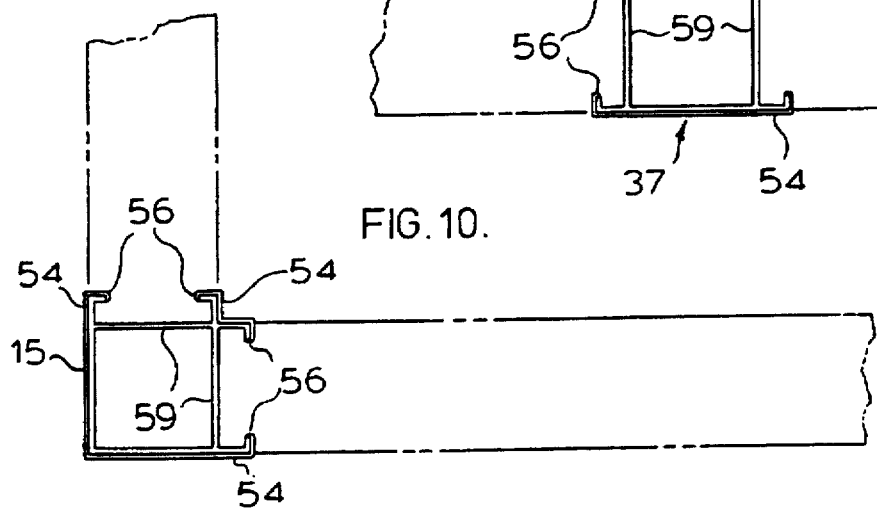

The spacing between the exterior and interior surface of the panels at 51 and 52 extending from the grooves 49 to the panel edge or side walls 50 is reduced to accommodate the thickness of the ends or flanges 53 of the joiner 13 illustrated in FIG. 5 or the projecting walls 54 of the various columns 14, 15 and 31 illustrated in FIGS. 9, 10 and 11. With this arrangement, the exposed surfaces of the panels are flush with the exposed surfaces of the joiners or columns to present smooth continuous exposed surfaces.

The joiners 13 have inturned flanges 55 adapted to slidingly engage and seat in the grooves 49 in the wall and roof panels to form an interlock therewith. Similarly, the box connectors or columns 14, 15 and 37 have inturned flanges 56 adapted to slidingly engage and seat in such grooves 49 to effect quick and simple sliding interlocking assembly of the components without the use of tools.

To facilitate this sliding interlock the end or side walls 50 of the panels are slightly concaved as illustrated in FIG. 5.

This maintains the panel end 50 out of contact with the web 58 of the joiner which on assembly becomes interior of the wall. This web 58 of the joiner is not covered with the skin 47 and would therefore resist sliding against the panel end. Also this arrangement avoids any interference with the sliding interlock if the tolerances of the panel walls 50 and the joiner web 58 are exceeded. The joiners smooth skin 47 extends around the ends of the inturned flanges 55 so that they easily slide within the grooves 49 at the panel ends.

As noted with the panel and joiner components assembled the unskinned joiner webs 58 are contained internally within and protected by the wall or roof structure. In the same vein, the transverse walls 59 of the columns or box connectors 14, 15, and 39 are unskinned and, when assembled, are contained internally within and protected by the wall structure.

Figure 20:
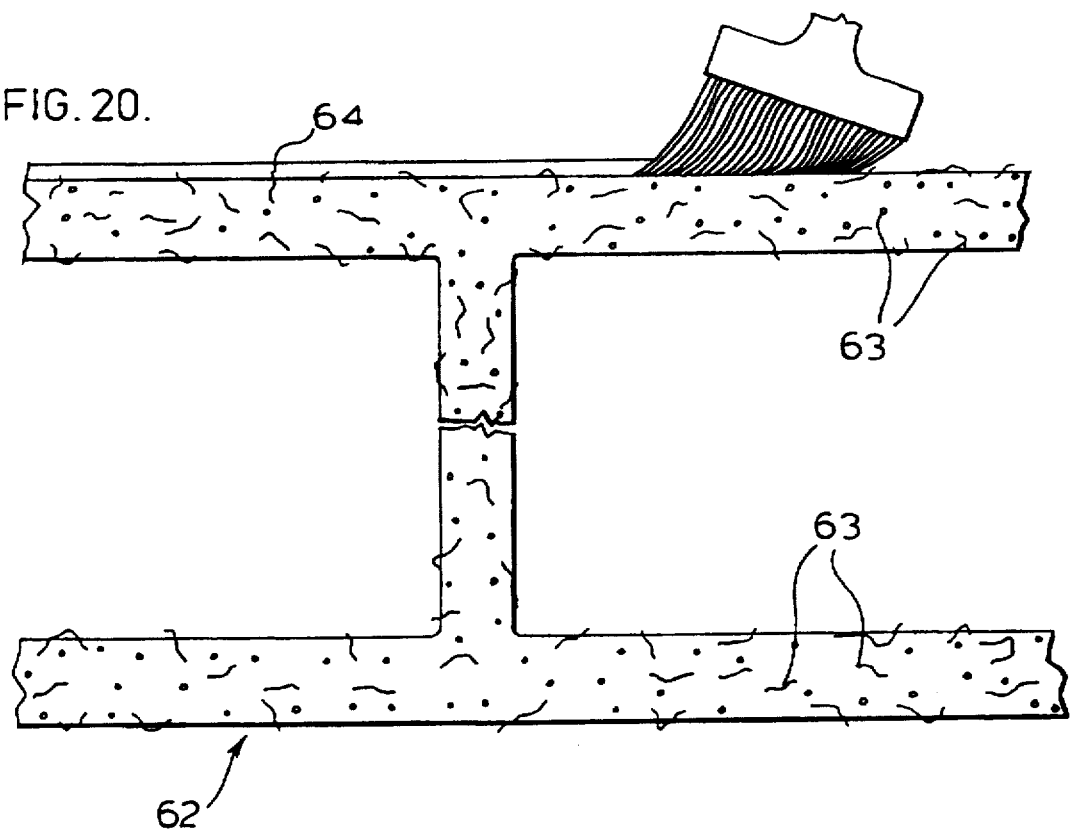
FIG. 20 is a view of a non load bearing interior wall panel in which the skin has been replaced by a coating such as paint.
Figure 19:
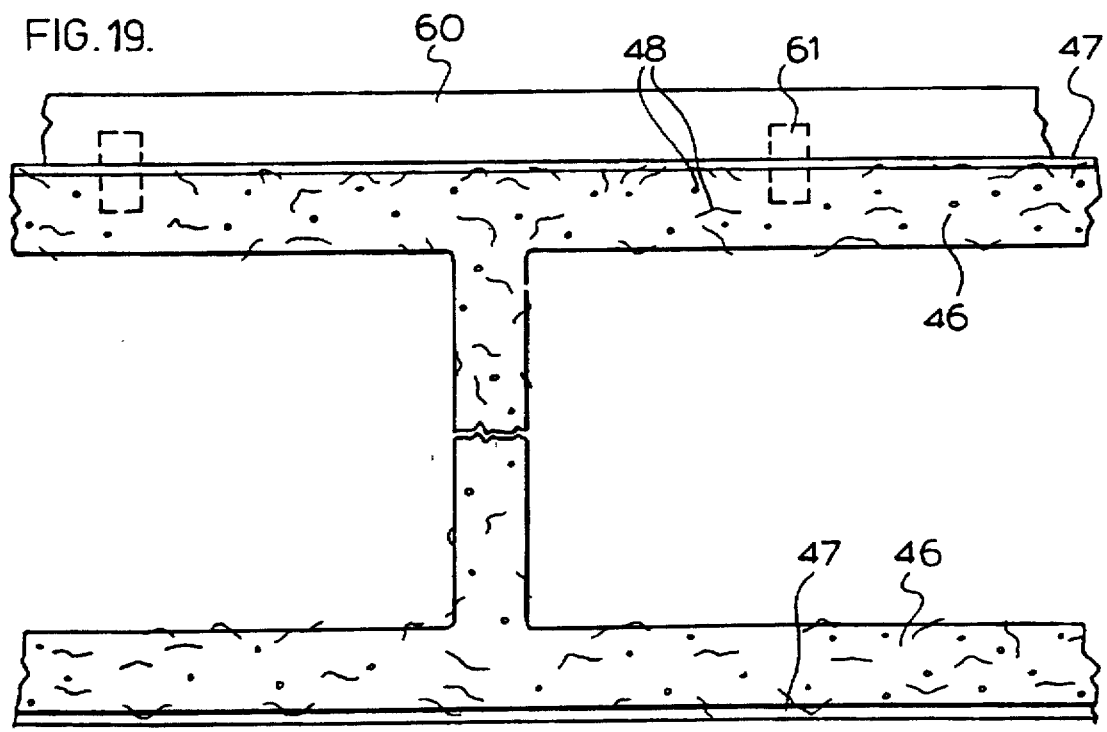
FIG. 19 is a broken away view illustrating an extruded reinforced wall panel embodying the invention having a decorative cladding applied to the exterior surface.

While the outer smooth plastic skin 47 presents a very attractive appearance which may be colored as desired, as shown in FIG. 19 a decorative facing illustrated at 60 may be applied to the panels such as wall panel 2. This decorative facing can take any desired form such as simulated brick, stone, clapboard and the like. It will also be appreciated that the roofing panels may also have a facing simulate roof tiling, shingles, and the like, the facing being attached by any suitable means diagrammatically illustrated at 61 in FIG. 20.

Where the wall panels are not required to have the same load bearing capacity as the wall panels previously described in the preferred embodiment for the outside walls of the house, that is for instance where the walls are to form interior walls, the thermoplastic material of these panels, such as the panel 62 in FIG. 20, may contain reinforcing agents other than glass fibers. Such other reinforcing agents indicated at 63 may comprise other fibers such as mineral fibers or non fibrous material such as calcium carbonate which would be readily flowable through an extrusion die. Further, the plastic outer skin may be omitted.

In such cases, the exposed surfaces Of the panels can be decorated and covered or sealed by a layer of paint 64 as illustrated in FIG. 20 or by wallpaper or decorative panelling and the like. paint 64 as illustrated in FIG. 20 or by wallpaper or decorative panelling and the like.

The method of forming the structural load bearing components comprising the panels 2 and 4, the columns 14, 15 and 31, the joiners 13 and the wall caps or beams and the roof panel end caps, according to the invention involves coextruding the smooth thermoplastic material skin layer 47 simultaneously with the glass fiber reinforced substrate material 46 and utilizing such skin layer as a lubricant to facilitate the flow of the substrate material through the forming dies. By so coextruding the skin layer protects the surfaces of the forming dies contacted thereby, isolating same from the abrasion of the exposed fiber glass ends or portions of the substrate material.

In the structural components such as the panels 2 and 4 which have internal transverse webs such as webs 9 bridging between the wall forming portions, extrusion is facilitated by having the width or thickness of these webs somewhat less than the thickness of the wall portions 7 and 8. As a practical example, with the thickness of the webs 9 chosen at 0.065 inches, the wall portions may have a thickness of 0.080 inches while the thickness of the skin 47 may be of the order of 0.015 inches, thus making the panel walls 7 and 8 0.030 inches thicker than the internal webs.

Structurally, the walls 8 and 9 of the panels can be looked at as the flanges of an I beam and the transverse webs 9 as the webs of the beam in considering loading capacity.

Similarly, the ends of the joiners 13 can be looked at as the flanges of an I beam while the transverse web or wall 58 is the web of the beam. The columns 14, 15 and 37 can be considered as box beams for structural purposes.

It will be appreciated that the example given is purely an example and the specific dimensions and proportions can readily be altered as appreciated by those skilled in the art.

The individual structural components of the invention are extruded in long continuous lengths and are cut off at the desired lengths required. In this connection, it will be appreciated that these components are capable of being sawn and notched without rupture to provided for door and window openings and the like to receive the windows 65 and doors 66 illustrated in FIG. 1.

Figure 14:
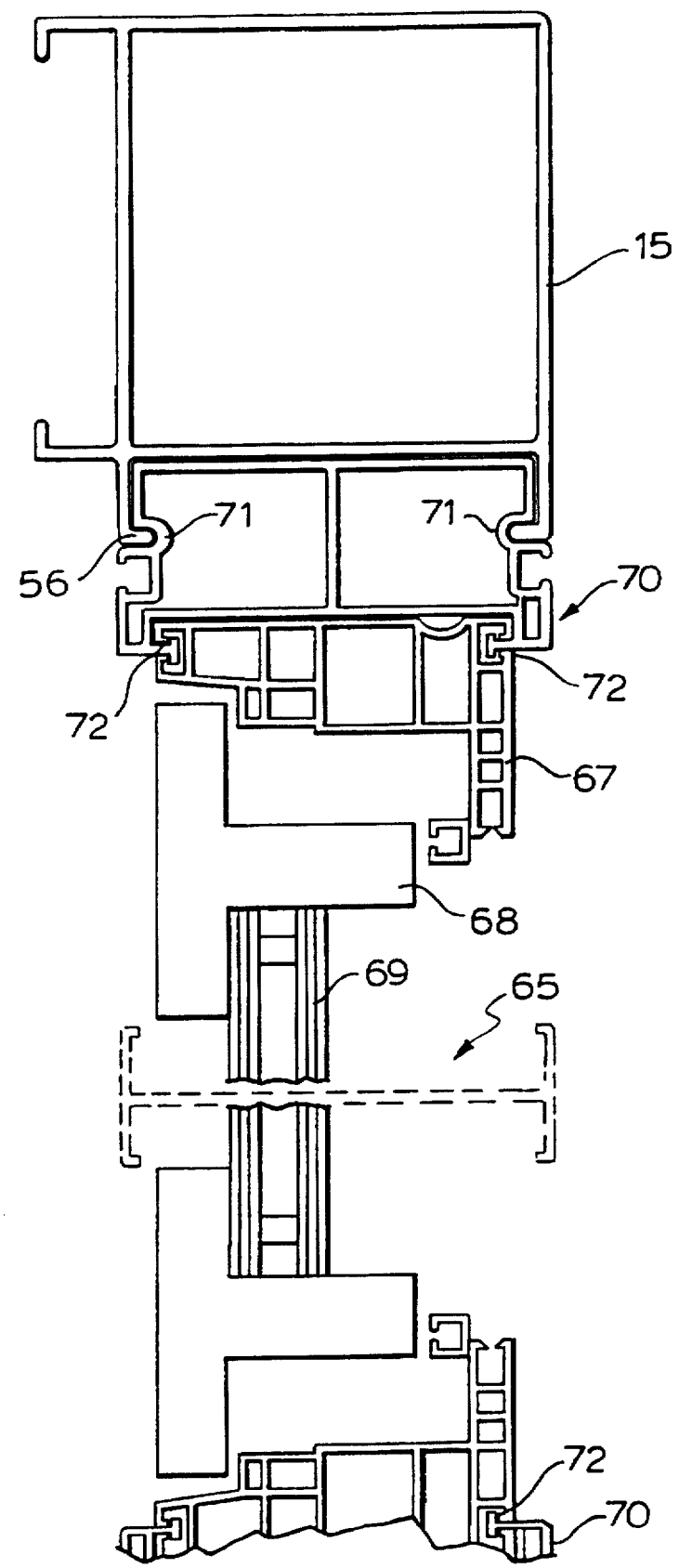
FIG. 14 is a cross-sectional view illustrating a window installation using an adapter configured to interlock with the wall columns and supporting a standard window.
Figure 18:
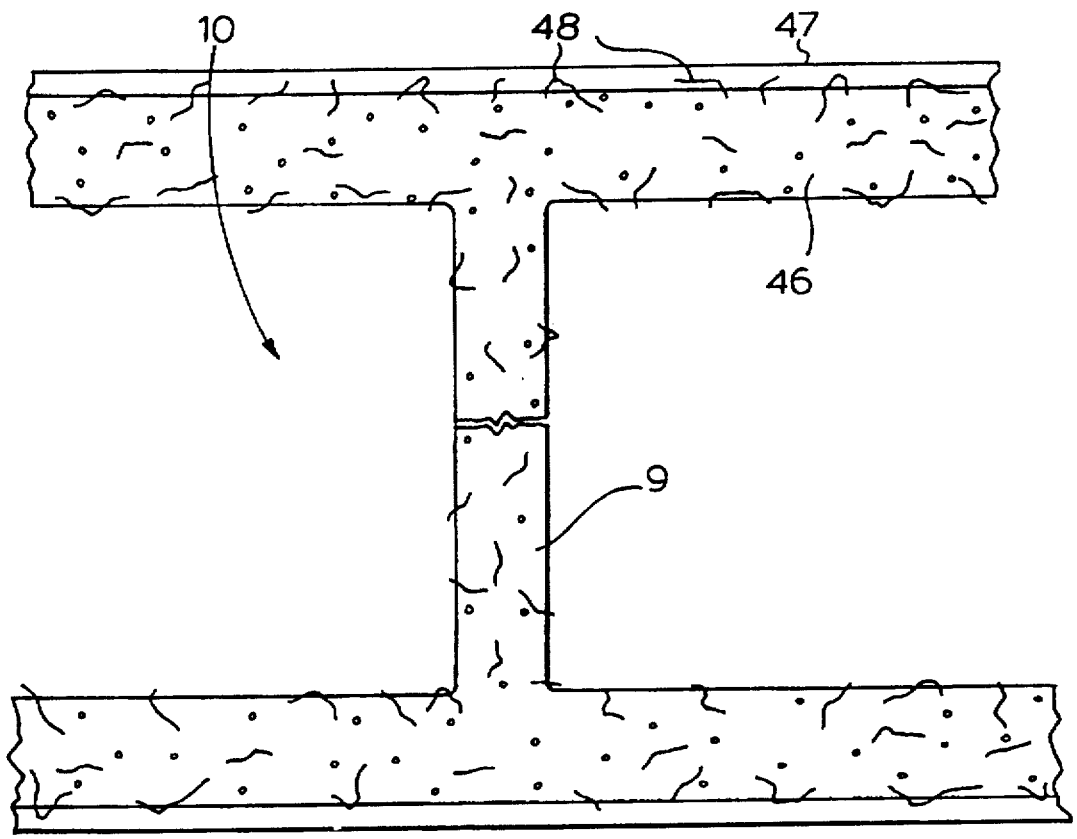
FIG. 18 is an enlarged broken away end view of a portion of a practical example of panel component or member embodying the invention and illustrating the relative thicknesses of the outer walls of the reinforced core and the internal connecting webs or walls and the bonded skin layer sealing the exposed external walls of the panel.

As shown in FIG. 14 for example, the window 65 may be a conventional window having a standard plastic window frame 67 mounting the window sash 68 carrying the glass 69. To mount the window, extruded hollow thermoplastic adapters 70 are provided which are formed with channels or grooves 71 which interlock, for example, with the inturned flanges 56 of one of the box columns, depending upon the position of the window, corner box column 15 being shown. The adaptors are proportioned so that with a window they span between two columns to maintain the chosen one meter modular format of the house. Thus, the window unit with adaptors 70 illustrated in FIG. 14 it will extend between interlock with the corner column 15 and an intermediate column 15.

The adapter 70 is provided with legs 72 which interengage with and carry the window frame 67. It will be understood that the window unit including the adapters 70 can be simply slid into position or assembled in the same manner as the panels and connectors are assembled without requiring tools or other fastening means.

Similar arrangements can be provided for accommodating the doors 66 which also are readily available in plastic as will be readily appreciated.

While the use of the structural components of the invention to form a house or building is described in detail FIG. 21 shows the use of structural components according to the invention for producing a simple wall 73 such as a highway sound barrier, a fence or a divider. In this connection panels corresponding to panels 2 are provided and interlocked with joiners 13 or if desired box connectors and anchored by concrete poured therein to a concrete base 74 with anchor rods 75. Such a wall will have exceptional permanency, strength, and weatherability with low cost materials and can be erected quickly and easily by simply sliding the components into interlocking engagement. FIG. 22 shows in diagramatic form the use of panels 2, formed into a simple enclosure 76 using corner box connectors or column 15

It will be understood from the foregoing that the invention provides structural components and a structural system for erecting structures from simple structures to complete buildings in which the structural components having the requisite load bearing and structural requirements can be mass produced at low cost and can be erected and locked together by simply sliding them into place so that erection can be effected rapidly and easily just by a pair of workmen.

In addition to their other advantages discussed above, the structural components have low heat retention, that is they form poor thermal sinks and do not readily transfer heat and cold. Thus, in using the structure for building enclosures the wall structures of the enclosure, particularly when filled with concrete, provide excellent insulation against the transfer of heat and cold.

Again, for the building of housing or other buildings, the fact that the roof panels are hollow and provide air circulation as well as having low thermal conductivity enables these panels to form excellent insulation against the transfer of heat and cold through to the interior of the building.

It should also be noted that the interlocking connections between the various structural components provides a tortuous path effectively blocking the ingress of moisture at these points of connection while, of course, the components themselves are impervious to moisture penetration.

Although various preferred embodiments of the present invention have been described herein in detail, it will be appreciated by those skilled in the art, that variations may be made thereto without departing from the spirit of the invention or the scope of the appended claims.

I claim:

1. Hollow rectilinear thermoplastic structural components for a structural building system in which said components have spaced longitudinally extending interlocking means for slidable interlocking engagement with adjacent mating components characterized in that each said hollow component is a co-extrusion of a hollow substrate and an impact resistant and weather protecting skin substantially thinner than the walls of said substrate, said substrate comprises a polyvinyl chloride reinforced with a reinforcing and expansion controlling constituent extruded into a hollow form having a rough surface with said co-extruded impact resistant and weather protecting skin covering the surfaces of said hollow component which are exposed as exterior walls when said hollow component is interlocked with a mating component, said skin has a thickness sufficient to cover and seal and interlock with the underlying rough substrate surfaces to present said exposed exterior walls as planar smooth surfaces.

2. A hollow component according to claim 1 characterized in that said skin has a thickness at least of the order of about 0.015 inches and said substrate has a thickness of the order of about 4 to 5 times the thickness of said protective skin.

3. A hollow component according to claims 1 or 2 characterized in that the spacing between opposing walls of said hollow component is of the order of about 4 inches.

4. A hollow component as claimed in claim 1 characterized in that said polyvinyl chloride substrate reinforcing constituent is selected from one or more of calcium carbonate and fine short fibers.

5. A hollow component according to claim 4 characterized in that said fine short fibers are mineral fibers or glass fibers projecting ends of which are embedded in said skin.

6. A hollow component as claimed in claims 4 or 5 in which said substrate surface is porous and said co-extruded skin seals the underlying substrate surfaces against the ingress of moisture.

7. A hollow component according to claim 1 characterized in that said polyvinyl chloride substrate reinforcing agent comprises short glass fibers having a diameter of a few microns, the concentration of said glass fibers being a small percentage of the combined weight of glass fibers and polyvinyl chloride.

8. A component according to as claimed in claim 1 characterized in that said skin comprises a polyvinyl chloride containing impact resisting and weathering agents.

9. A component as claimed in claim 1 characterized in that said hollow component comprises a hollow panel having spaced sidewalls connected by edge walls and having internal web walls spanning between said sidewalls, said sidewalls being formed with longitudinally extending inwardly projecting oppositely registering grooves adjacent each edge wall said grooves forming said interlocking means and said impact resisting and weather protecting skin totally encompasses the exterior surfaces of said panel.

10. A panel according to claim 9 characterized in that said internal webs are of a substrate material and are thinner than the substrate portion of said skin coated walls.

11. A panel according to claims 9 or 10 characterized in that the substrate portion of said skin coated walls has a thickness of the order of 0.08 inches and said webs have a thickness of the order of 0.065 inches.

12. A panel according to claims 9 or 10 characterized in that the skin coated edge walls are concaved.

13. A structural component as claimed in claim 1 characterized in that said component comprises a hollow box connector having walls provided with opposed projecting flanges provided at their ends with oppositely registering inturned locking fingers said walls, flanges and inturned fingers being coated with said protective skin.

14. A hollow rectilinear thermoplastic structural component having spaced longitudinally interlocking means for slidably interlocking engagement with adjacent mating components characterized in that said component is a coextrusion of a hollow substrate comprised of polyvinyl chloride containing a reinforcing and expansion controlling agent and a protective thermoplastic skin covering surfaces of said hollow substrate which are exposed as external walls of said component when same is interlocked with mating components, the walls of said substrate covered by said skin being substantially thicker than said protective skin and the width of said component between said exterior walls being of the order of several tens of times the combined thickness of said substrate and skin of said skin covered substrate walls.

15. A hollow rectilinear thermoplastic structural component as claimed in claim 14 characterized in that it is extruded as a panel provided with locking grooves (49) and having a plurality of internal compartments defined by webs of substrate material bridging between said skin covered substrate walls, said webs having a thickness less than said skin covered substrate walls and substantially greater than the thickness of saw skin.

16. A hollow rectilinear thermoplastic structural component as claimed in claim 14 characterized in that it is extruded as a box connector having integral locking fingers.

17. A hollow rectilinear thermoplastic structural component as claimed in claims 14, 15 or 16 characterized in that the thickness of said skin covered substrate is at least of the order of about 08 inches, said skin is at least of the order of about 0.015 inches.

18. A hollow rectilinear thermoplastic structural component as claimed in claims 14, 15 and 16 in which said reinforcing and expansion controlling agent is calcium carbonate.

19. A hollow rectilinear thermoplastic structural component as claimed in claim 14 in which the width between said exterior walls is of the order of about 4 inches.

* * * * *